United States Patent [19]

Nishino

[11] Patent Number: 4,755,079
[45] Date of Patent: Jul. 5, 1988

[54] CONNECTION STRUCTURE HAVING SEALING FUNCTION FOR SPIGOT MEMBER

[76] Inventor: Yuzi Nishino, 4-71, 3-Chome Wakaehigashimachi, Higashiosaka-Shi, Japan

[21] Appl. No.: 4,131
[22] Filed: Jan. 16, 1987
[51] Int. Cl.$^4$ .................... F16D 9/00; F16B 33/04
[52] U.S. Cl. ........................ 403/2; 403/296; 403/343; 411/5; 411/369; 411/542
[58] Field of Search ............... 285/3, 4, 220; 411/369, 411/368, 372, 3, 2, 5, 542, 533, 915; 403/343, 2, 338, 274, 282, 288, 296

[56] References Cited

U.S. PATENT DOCUMENTS

| 2,704,676 | 3/1955 | Harding | 285/220 |
| 3,469,490 | 9/1969 | Pearce, Jr. | 403/288 X |
| 3,561,317 | 2/1971 | Rowell | 411/5 |
| 4,460,300 | 7/1984 | Bettini et al. | 411/542 X |
| 4,502,825 | 3/1985 | Yamada | 411/5 |
| 4,611,093 | 9/1986 | Farmer et al. | 411/5 X |
| 4,639,175 | 1/1987 | Wollar | 411/542 X |

FOREIGN PATENT DOCUMENTS 45-36689  11/1970  Japan.

Primary Examiner—Randolph A. Reese
Assistant Examiner—Peter M. Cuomo
Attorney, Agent, or Firm—Wenderoth, Lind & Ponack

[57] ABSTRACT

A structure for connecting a plug or like spigot member to an internally threaded socket portion of a device by screwing a male screw projecting from the spigot member into the socket portion. When the spigot member is tightened up, a flange of metal formed on the shank of the screw integrally therewith over the entire circumference of the shank is cut off and clamped between the socket portion and the spigot member to provide a gas- or air-tight connection permitting no leakage.

2 Claims, 2 Drawing Sheets

CONNECTION STRUCTURE HAVING SEALING FUNCTION FOR SPIGOT MEMBER

BACKGROUND OF THE INVENTION

The present invention relates to a connection structure having a sealing function for connecting plugs, nozzles, terminals, connectors, and the like that have a spigot portion (hereinafter referred to as "spigot members") to socket portions of gas, pneumatic or like devices by screwing the spigot member into the socket portion. When the spigot member is tightly screwed into the socket portion, a seal flange integrally formed with the spigot member is cut off at the same time to serve as a seal packing for completely preventing leakage of gas or air.

With spigot members of the type mentioned, rubber packings are generally used for sealing. However, rubber packings are not fully satisfactory for corrosion resistance to highly corrosive gases and are, therefore, limited in application for use for a prolonged period of time.

In the field of bolts, spigot members have been proposed which are integrally provided with a washer adapted to be cut off when the spigot member is tightened up (as disclosed, for example, in Examined Japanese Patent Publication SHO 45-36689). The washer of this known spigot member is in the form of an annular flange integrally formed with the shank of a bolt under its head. The flange is spot-joined to the bolt shank at two to three portions around the shank, so that when the flange is separated off, twisted projections remain at these portions, making it impossible to hold the entire flange under uniform pressure. Moreover, the bolt portion including the flange is difficult to make by cutting, and the spigot member can not be manufactured with high precision.

SUMMARY OF THE INVENTION

The present invention completely solves these problems heretofore encountered.

A first object of the present invention is to provide a connection structure having a sealing function which assures intimate contact between two opposed sealing surfaces to completely eliminate leakage.

A second object of the present invention is to provide a device of the type described and having grooves of specified width and depth which are easy to cut.

A third object of the present invention is to provide a spigot member connection structure which has a sealing function and which can be produced at a low cost without the likelihood of the cutting tool breaking.

A fourth object of the present invention is to provide a spigot member connection structure which achieves an outstanding sealing effect irrespective of whether the spigot member is circular, hexagonal or otherwise shaped in cross section.

DESCRIPTION OF THE PREFERRED EMBODIMENT

With reference to the accompanying drawings, the preferred embodiment of the invention will be described below.

Figure 1:
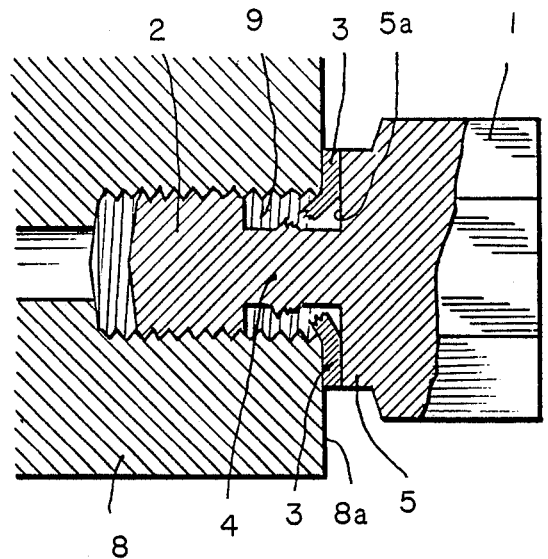
FIG. 1 is a side elevation in vertical section and showing an embodiment of the present invention with a spigot member screwed in place.
Figure 2:
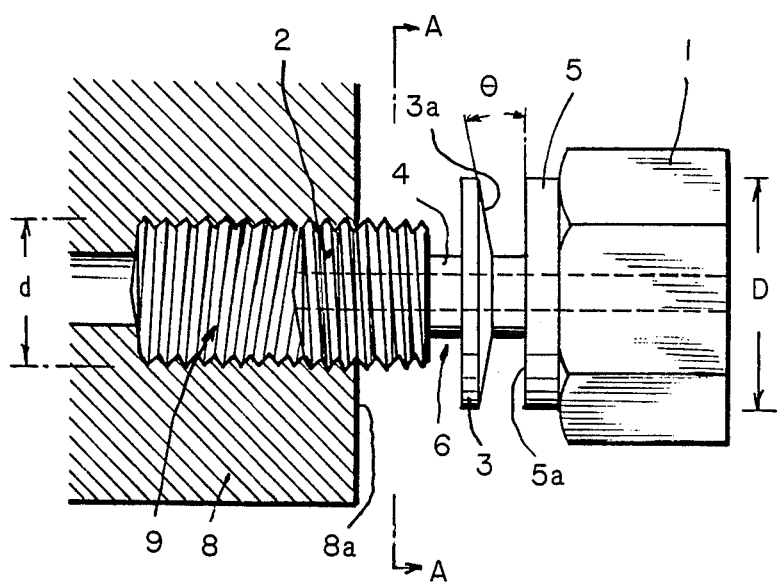
FIG. 2 is a side elevation partly in vertical section and showing the same before the spigot member is completely screwed in place.
Figure 3:
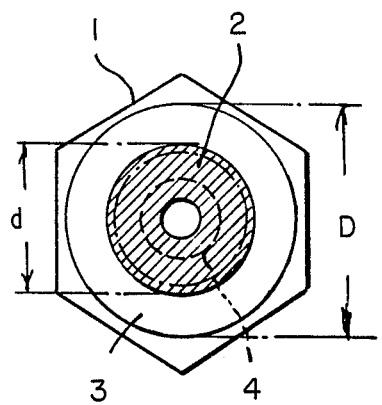
FIG. 3 is a view in section taken along the line A—A in FIG. 2.

FIGS. 1 and 2 show a spigot member 1, a male screw 2 projecting from the front end of the member 1, and a seal flange 3 integrally formed on the shank 4 of the screw 2 at an intermediate portion thereof. The spigot member 1 is integrally provided at its front end with a projecting circular stepped portion 5 having an outside diameter D larger than the diameter d of the male screw 2. The seal flange 3 is positioned between the stepped portion 5 and the threaded portion of the male screw 2, with circumferential grooves 6 and 7 formed in the shank 4 immediately in front and rear of the flange 3, respectively. The seal flange 3 has the same outside diameter as the stepped portion 5. The seal flange 3 has an outwardly tapered surface 3a opposed to the stepped portion 5 and having an inclination $\theta$ with respect to the front surface of the portion 5 as seen in FIG. 2.

The spigot member 1 is hexagonal in cross section as illustrated, or in the form of a hollow cylinder or otherwise shaped. Irrespective of the shape of the spigot member, the stepped portion 5 at the front end thereof is shaped in the form of a disk conforming to the shape of the seal flange 3, so that the surface of the portion 5 to be pressed against the seal flange 3 can be finished properly with high accuracy.

Figure 4:
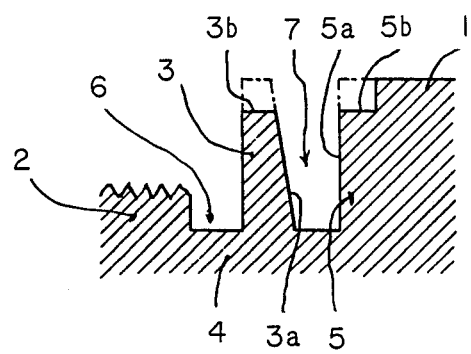
FIG. 4 is an enlarged fragmentary view in section showing the spigot member.

FIG. 4 shows how the seal flange 3 and the stepped portion 5 are formed. The circumferential grooves 6 and 7 are formed by a cutting tool. At this time, a step 5b and the periphery 3b of the flange are formed by cutting, and the tapered surface 3a is also formed by forwardly inclining the tool, whereby the device of the invention can be produced with high precision.

OPERATION AND ADVANTAGES

When the male screw is inserted into an internally threaded socket portion 9 of a device 8 in screw-thread engagement therewith, the front surface of the seal flange 5 comes into contact with the surface 8a of the socket portion, which in turn prevents further advance of the screw 2. However, as the screw 2 is subsequently forcibly advanced, the seal flange 3 is clamped between the surface 8a and the front surface 5a of the stepped portion 5 while being deformed to a lateral V-shape and is eventually cut or sheared off at its base portion upon exceeding a limit as shown in FIG. 1. The front surface of the projecting circular stepped portion 5 is planar, whereas the surface of the seal flange 3 opposed to the portion 5 is tapered as at 3a. Consequently, as the flange is thus subjected to increasing pressure, the flange is so deformed that the bulging base portion is collapsed to a flat form, to come into intimate contact with the stepped portion and provide a perfect seal on completion of tightening.

With the structure of the present invention described above, the tapered surface of the clamped seal flange is collapsed and thereby deformed for the seal flange to intimately contact the stepped portion, consequently forming a perfect seal for reliably preventing any leakage. The present device is easy to make by cutting with a concurrent reduced likelihood of breakage of the cutting tool. the seal flange, which is pressed by the stepped portion having the same diameter as the flange, exerts an effective sealing force with a uniform torque. Even when the spigot member is square or otherwise shaped, a reliable connection is available without any objection. The present structure is therefore advantageous also with respect to production procedure and cost.

What is claimed is:

1. A connection structure having a sealing function for connecting a spigot member to an internally threaded socket portion of a device by inserting a male screw projecting from the front end of the spigot member into the socket portion intight screw-thread engagement therewith, the connection structure comprising a spigot member being integrally provided at its front end with a projecting circular stepped portion having a larger outside diameter than the male screw and the spigot member having a seal flange positioned between the stepped portion and the threaded portion of the screw and formed on the shank of the male screw integrally with the shank over the entire circumference thereof, with a circumerential groove formed at each of the front and rear sides of the seal flange, the seal flange having the same diameter as the stepped portion and an outwardly tapered surface opposed to the stepped portion, wherein in use the male screw is threadedly inserted into the internally threaded socket portion of a device, the male screw being threaded past the point of insertion at which the seal flange contacts the device adjacent the threaded socket portion of the device, whereby the seal flange is sheared off at its integral circumferential connection with the spigot member, thereby allowing the stepped portion to press against the outer tapered surface of the flange, hold the flange against the device, and provide a sealing function.

2. A connector for sealing an internally threaded socket portion of a device, said connector comprising
    a shank having a first and second end;
    a threaded portion on said first end of said shank for engaging an internally threaded socket portion of a device;
    a head on said second end of said shank for turning said connector and threading said threaded portion into an internally threaded socket portion;
    a projecting circular stepped portion integrally connected to said shank between said head and said threaded portion, and having a larger outside diameter than said threaded portion; and
    a seal flange integrally connected to said shank around the entire circumference of said shank, located between said projecting circular stepped portion and said threaded portion, having the same diameter as said stepped portion, and having an outwardly sloped surface in spaced opposed relation to said stepped portion; wherein in use said threaded portion is inserted into the socket portion of a device past the point where said seal flange contacts the device, whereby said seal flange is sheared off at its integral circumferential connection and said stepped portion presses said sheared off flange against the device thereby providing a sealing function.

* * * * *